(12) United States Patent
Gottselig et al.

(10) Patent No.: US 7,167,836 B2
(45) Date of Patent: Jan. 23, 2007

(54) METHOD AND SYSTEM OF RESTRICTED SUBSTANCE MANAGEMENT AND RECYCLING

(75) Inventors: Bernd Gottselig, Bergisch Gladbach (DE); Bing Chang Xu, Bloomfield, MI (US); Frank Kovacic, Tecumseh (CA); Holly Zhang, Northville, MI (US); John Lincoln Nelson, Whitmore Lake, MI (US); Pratapa Srikiran, Inkster, MI (US); Richard J. Gilbert, Ann Arbor, MI (US)

(73) Assignee: Ford Motor Company, Dearborn, MI (US)

( * ) Notice: Subject to any disclaimer, the term of this patent is extended or adjusted under 35 U.S.C. 154(b) by 719 days.

(21) Appl. No.: 09/682,988

(22) Filed: Nov. 5, 2001

(65) Prior Publication Data
US 2003/0088424 A1 May 8, 2003

(51) Int. Cl.
*G06F 19/00* (2006.01)
(52) U.S. Cl. ........................................ 705/28; 700/107
(58) Field of Classification Search ................ 705/28, 705/29, 1, 7, 8, 10, 11; 707/102, 104.1; 700/107, 700/106
See application file for complete search history.

(56) References Cited

U.S. PATENT DOCUMENTS

| | | | |
|---|---|---|---|
| 4,788,716 A | 11/1988 | Zebe | |
| 5,038,367 A | 8/1991 | Casey et al. | |
| 5,392,095 A | 2/1995 | Siegel | |
| 5,712,990 A * | 1/1998 | Henderson | 705/28 |
| 5,913,204 A | 6/1999 | Kelly | |
| 5,940,471 A | 8/1999 | Homayoun | |
| 5,950,169 A * | 9/1999 | Borghesi et al. | 705/4 |
| 5,970,121 A | 10/1999 | Homayoun | |
| 6,449,597 B1 * | 9/2002 | McGill | 705/1 |
| 6,483,581 B1 * | 11/2002 | Ben-Amotz et al. | 356/301 |
| 6,668,203 B1 * | 12/2003 | Cook et al. | 700/65 |
| 6,952,807 B1 * | 10/2005 | Antosz | 715/810 |
| 2001/0042030 A1 * | 11/2001 | Ito et al. | 705/27 |
| 2002/0049622 A1 * | 4/2002 | Lettich et al. | 705/7 |
| 2002/0052666 A1 * | 5/2002 | Fukatsu et al. | 700/107 |
| 2002/0178023 A1 * | 11/2002 | Bjerre et al. | 705/1 |
| 2003/0004965 A1 * | 1/2003 | Farmer et al. | 707/104.1 |
| 2005/0187834 A1 * | 8/2005 | Painter et al. | 705/28 |

FOREIGN PATENT DOCUMENTS

JP 02000339015 A * 12/2000

OTHER PUBLICATIONS

Vendors Manual A Vendor's Guide on How to do Business with the Commonwealth of Virginia 1998.*

* cited by examiner

*Primary Examiner*—Igor N. Borissov
(74) *Attorney, Agent, or Firm*—Gary A. Smith

(57) ABSTRACT

A method is provided of restricted substance management and recycling in a manufacturing environment. The method includes the steps of inputting restricted substances and recycle content data of parts supplied by a supplier for a vehicle into a computer system of a vehicle manufacturer. The method also includes the steps of reviewing the inputted data and determining parts with banned or recycled content or substances over predetermined thresholds. The method further includes the steps of reporting the determined parts to the supplier and vehicle manufacture.

17 Claims, 5 Drawing Sheets

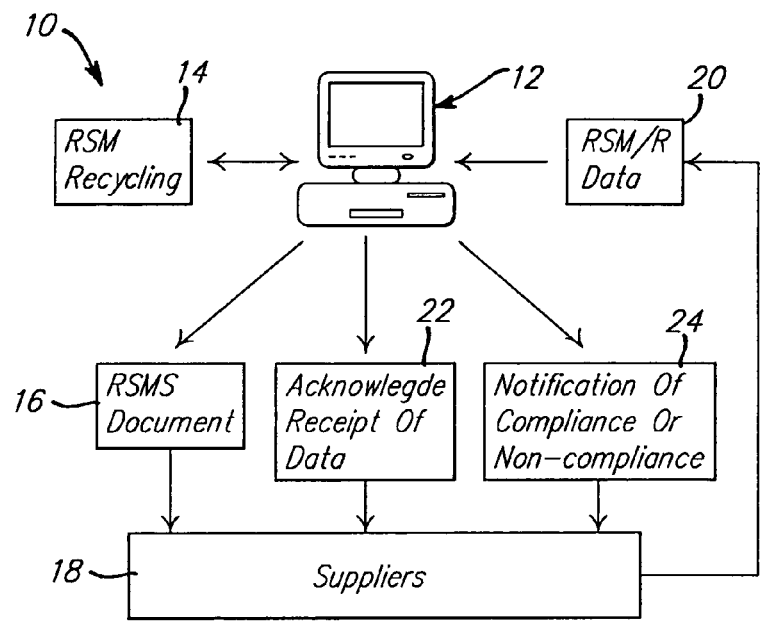
FIG. 1.
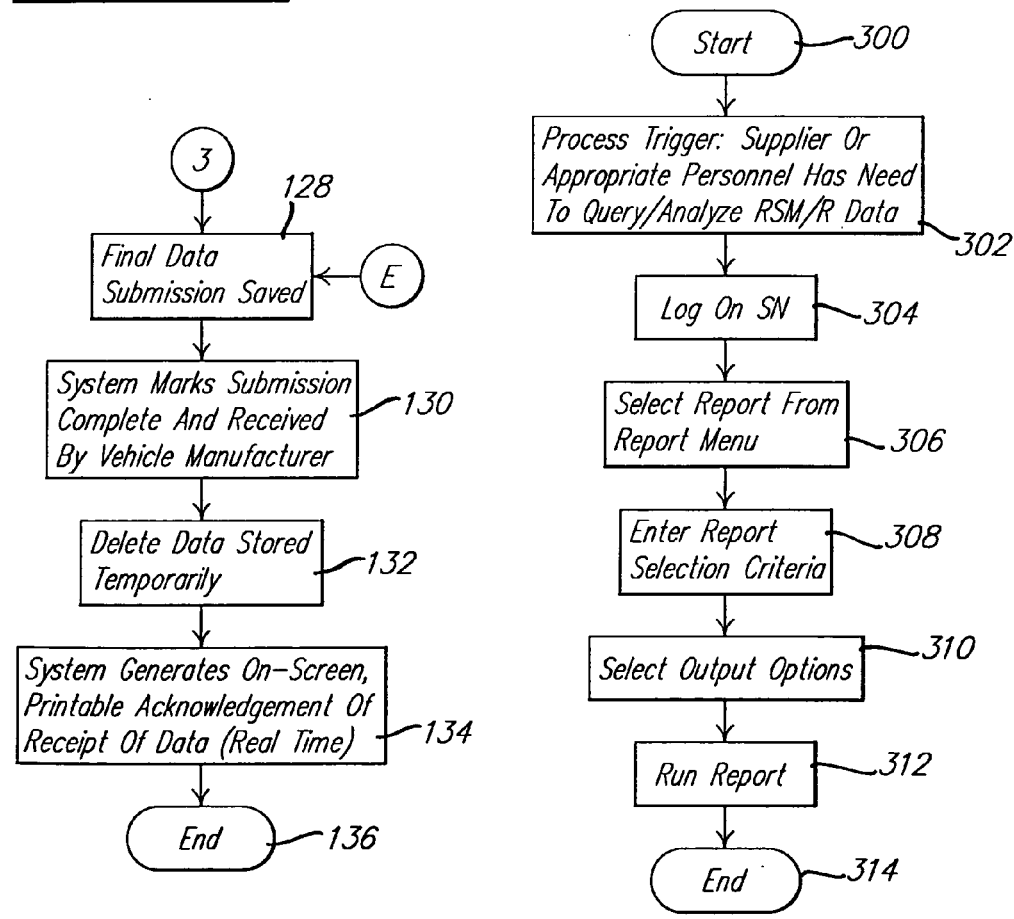
FIG. 3D.
FIG. 4.

METHOD AND SYSTEM OF RESTRICTED SUBSTANCE MANAGEMENT AND RECYCLING

BACKGROUND OF INVENTION

1. Field of the Invention

The present invention relates generally to methods and systems of recycling and, more specifically, to a method and system of restricted substance management and recycling in a manufacturing corporate environment.

2. Description of the Related Art

It is known for a vehicle manufacture to require information on restricted substances used in making components for a vehicle. In the past, a paper form having a number of questions and blank boxes were sent to suppliers to respond or report to the vehicle manufacturer regarding restricted substances and recycle content in components they supplied to the vehicle manufacturer. Once the forms were completed, the suppliers mailed or faxed them to the vehicle manufacturer. The vehicle manufacturer would review the completed forms for restricted substances. The completed forms were then stored in a box.

It is known that one vehicle manufacturer implemented a restricted substance recycling content system to gather information on restricted substances and recycle content from vehicle suppliers. This system, however, operated by mailing a computer disk to the vehicle suppliers who filled out information on the computer disk and mailed the computer disk back to the vehicle manufacturer. This system only collected recycled content amount of recycle in the component parts, not recyclibility of the material for the components.

Another system for collecting information on restricted substances is known. This system collects restricted substances information on vehicle components and collects recyclibility characteristics of the components to be recycled. The system allows one supplier to provide content data or information to the next tier upward. Each data set has a numeric identifier. The supplier, however, is able to conceal proprietary materials by listing them as miscellaneous content. The system suffers from the disadvantage that the vehicle manufacturer does not know what the miscellaneous content is.

One disadvantage of above systems is that they do not report accurately restricted substances and recycle content of components supplied to a vehicle manufacturer. Another disadvantage of the above systems is that they are manual based and not computer based. As a result, it is desirable to provide a method and system of restricted substance management and recycling in a manufacturing corporate environment. It is also desirable to provide a method of substance management and recycling that is computer based. Therefore, there is a need in the art to provide a method and system that meets these desires.

SUMMARY OF INVENTION

Accordingly, the present invention is a method of restricted substance management and recycling in a manufacturing environment. The method includes the steps of inputting restricted substances and recycle content data of parts supplied by a supplier for a vehicle into a computer system of a vehicle manufacturer. The method also includes the steps of reviewing the inputted data and determining parts with banned or recycled content or substances over predetermined thresholds. The method further includes the steps of reporting the determined parts to the supplier and vehicle manufacture.

One advantage of the present invention is that a method and system is provided of restricted substance management and recycling in a manufacturing corporate environment. Another advantage of the present invention is that the method and system is a web-based tool to assist corporate efforts in meeting environmental, health, and recycling goals, as well as regulatory requirements. Yet another advantage of the present invention is that the method and system replaces a labor-intensive, fax-based reporting process. Still another advantage of the present invention is that the method and system facilitates the collection of valuable information on recycled content in order to meet corporate targets and regulatory requirements for increased use of recycled materials in products. A further advantage of the present invention is that the method and system improves the identification, reduction, and elimination of certain hazardous substances in dimensional parts, which could possibly lead to worker exposure through assembly or further in house processing.

Other features and advantages of the present invention will be readily appreciated, as the same becomes better understood, after reading the subsequent description taken in conjunction with the accompanying drawings.

BRIEF DESCRIPTION OF DRAWINGS

FIG. 1 is a logic flow diagram of a method, according to the present invention, of restricted substance management and recycling.

FIGS. 3A through 3D are flowcharts of inputting restricted substance management and recycling data.

FIG. 4 is a flowchart of a method, according to the present invention, of creating reports for the restricted substance management and recycling.

DETAILED DESCRIPTION

Figure 2:
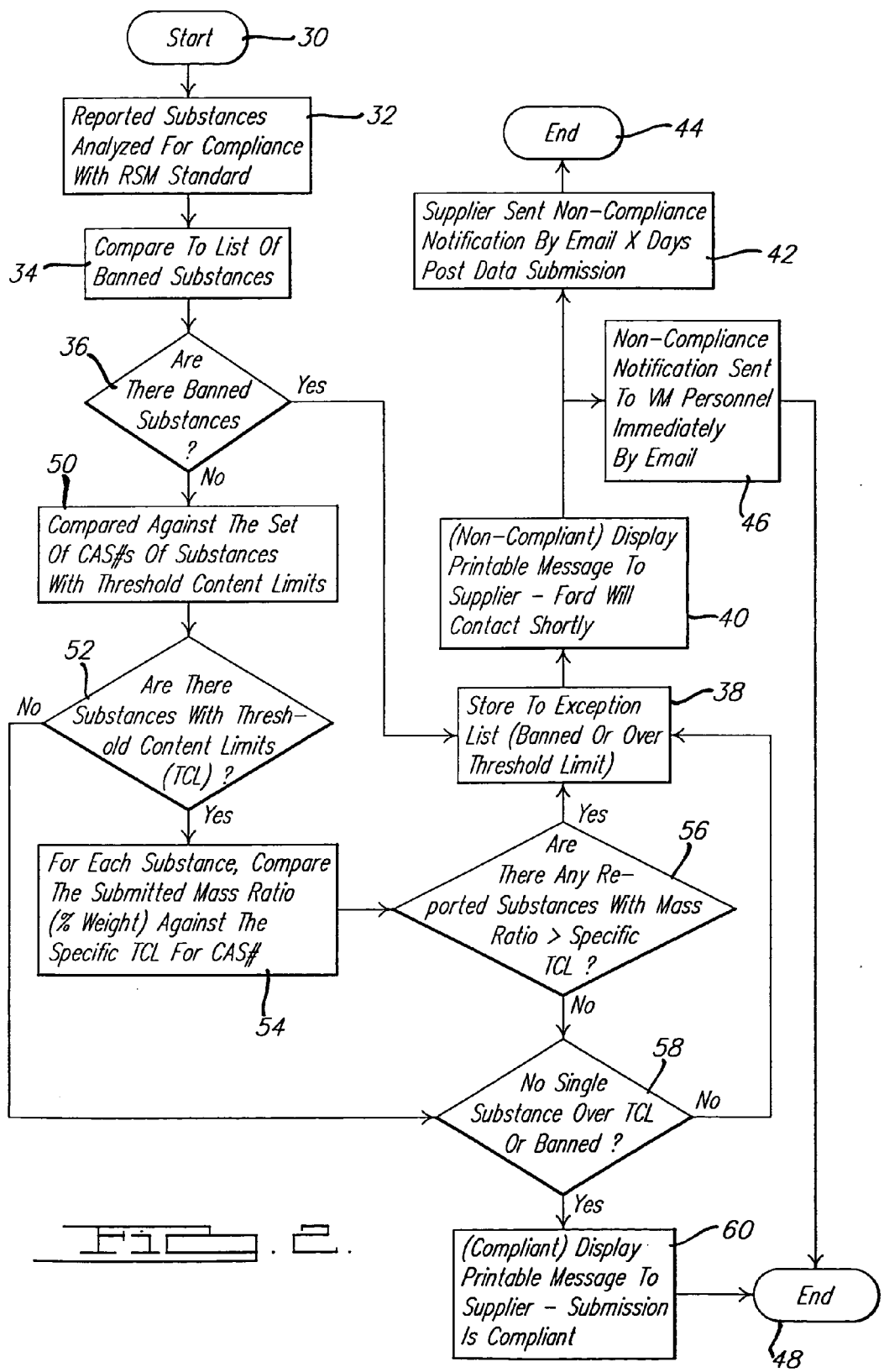
FIG. 2 is a flowchart of a method, according to the present invention, of restricted substance management and recycling.

Referring to the drawings and in particular FIG. 1, one embodiment of a system 10, according to the present invention, of restricted substance management and recycling in a manufacturing corporate environment is shown. The system 10 includes a computer system 12 having a computer with a memory, a processor, a display and user input mechanism, such as a mouse or keyboard (not shown). A method, according to the present invention, is implemented on the computer system 12 in Microsoft Excel, coupled with other lower level languages. It should be appreciated that the computer system 12 is conventional and known in the art.

In general, the system 10 accepts data, stores data, and determines compliance. The system 10 is based on the vehicle manufacturer network and assists the vehicle manufacturer and its suppliers to better track, reduce, and eliminate the use of substances of concern in products supplied to the vehicle manufacturer. As illustrated in FIG. 1, the system 10 includes a restricted substance management (RSM)/recycling team of the vehicle manufacturer in block 14. The RSM/recycling team uses the computer system 12 to send a recycling substance management system (RSMS) document in block 16 to one or more vehicle component suppliers in block 18. The suppliers use the computer system 12 to send RSM/recycling data in block 20 to the RSM/recycling team in block 14. The RSM/recycling team uses the computer system 12 to send an acknowledgement of receipt of the data in block 22 to the vehicle component supplier in block 18. The RSM/recycling team uses the computer system 12 to send a notification of compliance or non-compliance including instructions for RSMS deviation in block 24 to the vehicle component suppliers in block 18. It should be appreciated that the RSMS data may be stored on a server memory, the memory of the computer system 12, a magnetic disk storage device, or any one of numerous other electronic or magnetic storage devices. It should also be appreciated that the method to be described is web-based.

Referring to FIG. 2, a method, according to the present invention, of reviewing reported substances is shown. The method starts in bubble 30 and advances to block 32. In block 32, the reported substances are analyzed for compliance with a restricted substance management (RSM) standard. The method advances to block 34 and compares the reported substances to a list of banned substances. The method advances to diamond 36 and determines whether there are banned substances. If so, the method advances to block 38 and stores to exception list, which is a banned or over threshold limit. The method then advances to block 40 and displays a non-compliant printable message to the supplier and the vehicle manufacturer will contact the supplier shortly. After block 40, the method may advance to block 42 and supplier sent non-compliance notification by e-mail a predetermined number of days past data submission and end in bubble 44. The method may advance to block 46 and a non-compliance notification is sent to vehicle manufacturer personnel immediately by e-mail and ends in bubble 48.

In diamond 36, if there are no banned substances, the method advances to block 50 and compares against the set of CAS numbers of substances with threshold content limits. The method advances to diamond 52 and determines whether there are substances with threshold content limits (TCL). If so, the method advances to block 54 and for each substance, compares the submitted mass ratio (% weight) against the specific TCL for the Chemical Abstract Substance (CAS) number. The method advances to diamond 56 and determines whether there are any reported substances with mass ratio greater than specific TCL. If so, the method advances to block 38 previously described. If not, the method advances to diamond 58 and determines whether no single substance over TCL or banned. If not, the method advances to block 38 previously described. If so, the method advances to block 60 and displays a compliant printable message to supplier that submission is compliant. The method then advances to bubble 48 and ends.

Figure 3A:
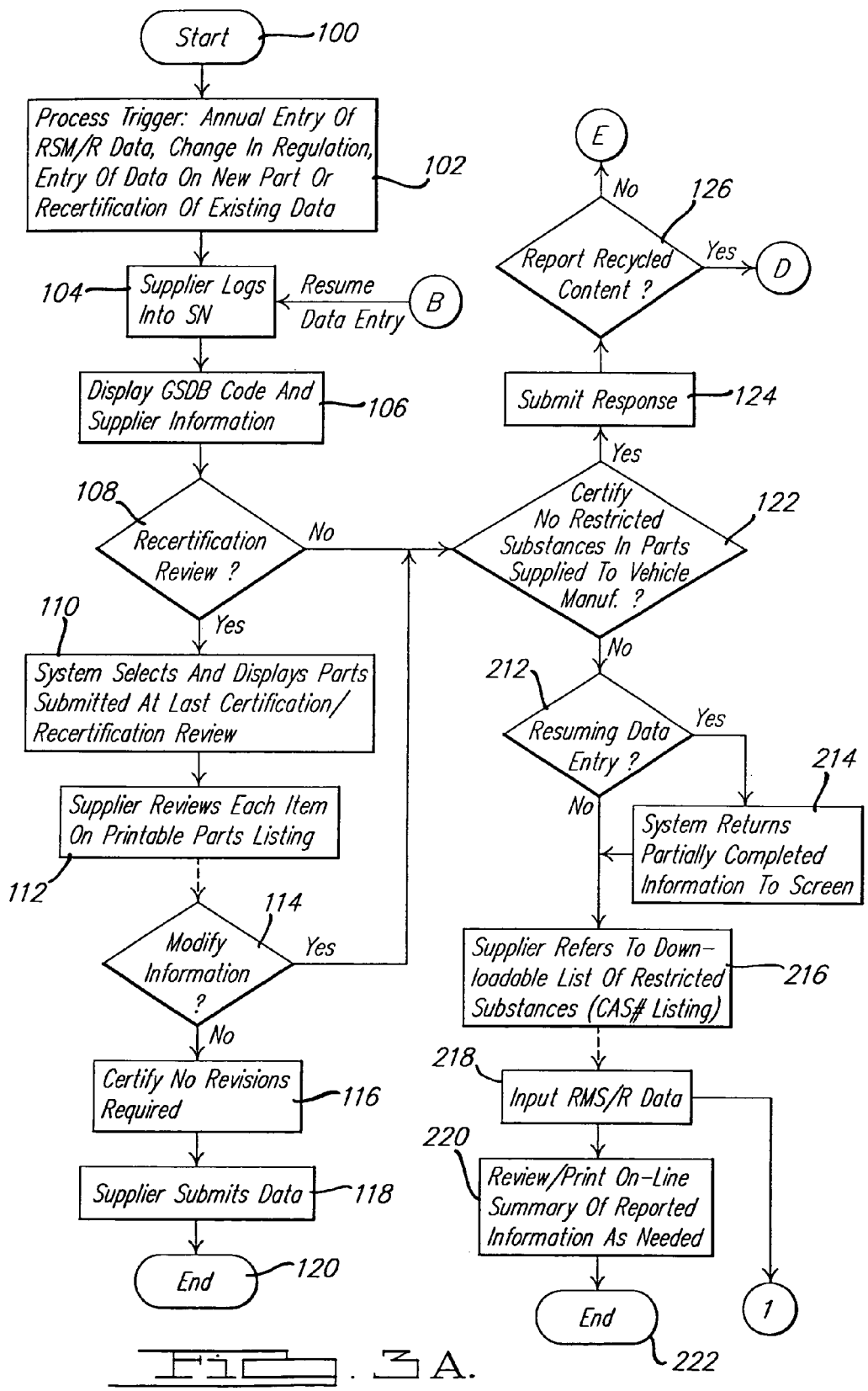

Referring to FIGS. 3A through 3D, a method of inputting data for restricted substance management and recycling, according to the present invention, is shown and carried out in accordance with the system 10. In FIG. 3A, the method starts in bubble 100 and advances to block 102. In block 102, the method allows a member of the RSM/recycling team to annually enter or input restricted substance management/recycling (RSM/R) data, change in regulation, entry of data on a new component or part, or re-certification of existing data via the computer system 12. The method advance to block 104 and the supplier logs into a supplier network (SN) of the vehicle manufacturer via the computer system 12. The method advances to block 106 and displays a global supplier data base (GSDB) code and supplier information. The method advances to diamond 108 and determines whether to review re-certification of the supplier information. If so, the method advances to block 110 and system 10 selects and displays components or parts submitted by the supplier at last certification/re-certification review of the supplier information. The method then advances to block 112 and the supplier reviews each item of the supplier information on a printable parts listing via the computer system 12. The method advances to diamond 114 and determines whether to modify the supplier information on the parts. If not, the method advances to block 116 and certifies no revisions are required to the supplier information. The method advances to block 118 and the supplier submits RSM/R data. The method then advances to bubble 120 and ends.

In diamond 108, if the recertification review of the supplier information is not to be performed, or in diamond 114, if the supplier information is to be modified, the method advances to diamond 122 and determines whether the supplier certifies that there are no restricted substances in parts supplied to the vehicle manufacturer. If the supplier certifies that there are no restricted substances in parts supplied to the vehicle manufacturer, the method advances to block 124 and the supplier submits the response or certification. The method advances to diamond 126 and determines whether recycled content of the parts is reported. If not, the method advances to block 128 in FIG. 3D. In block 128, the method saves the final RSM/R data submission by the supplier. The method advances to block 130 and the method marks submission complete and received by vehicle manufacturer. The method then advances to block 132 and deletes RSM/R data stored temporarily on the computer system 12. The method then advances to block 134 and generates on-screen, printable acknowledgement of receipt of RSM/R data in real time to the supplier via the computer system 12. The method then advances to bubble 136 and ends.

Figure 3B:
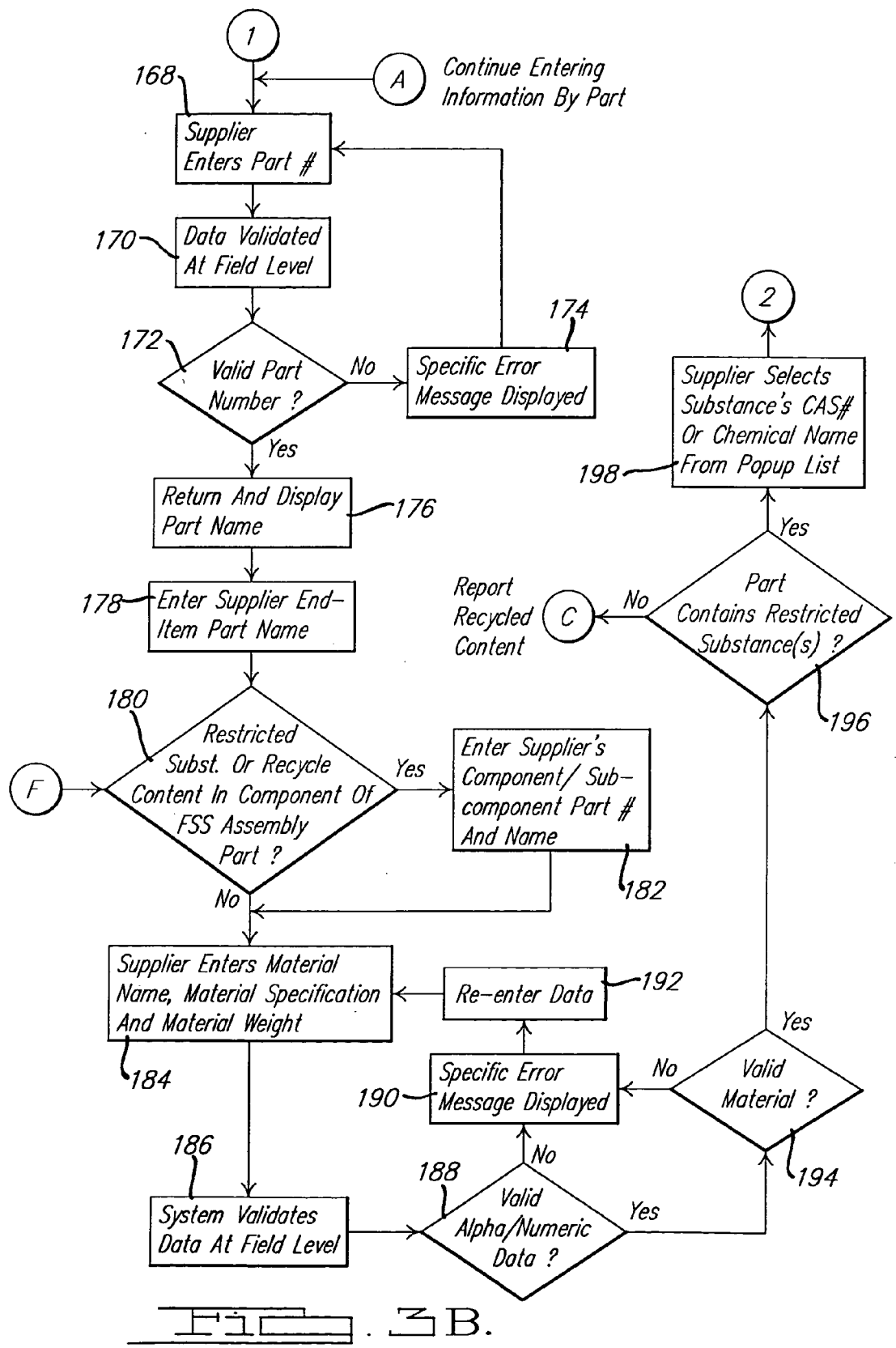
Figure 3C:
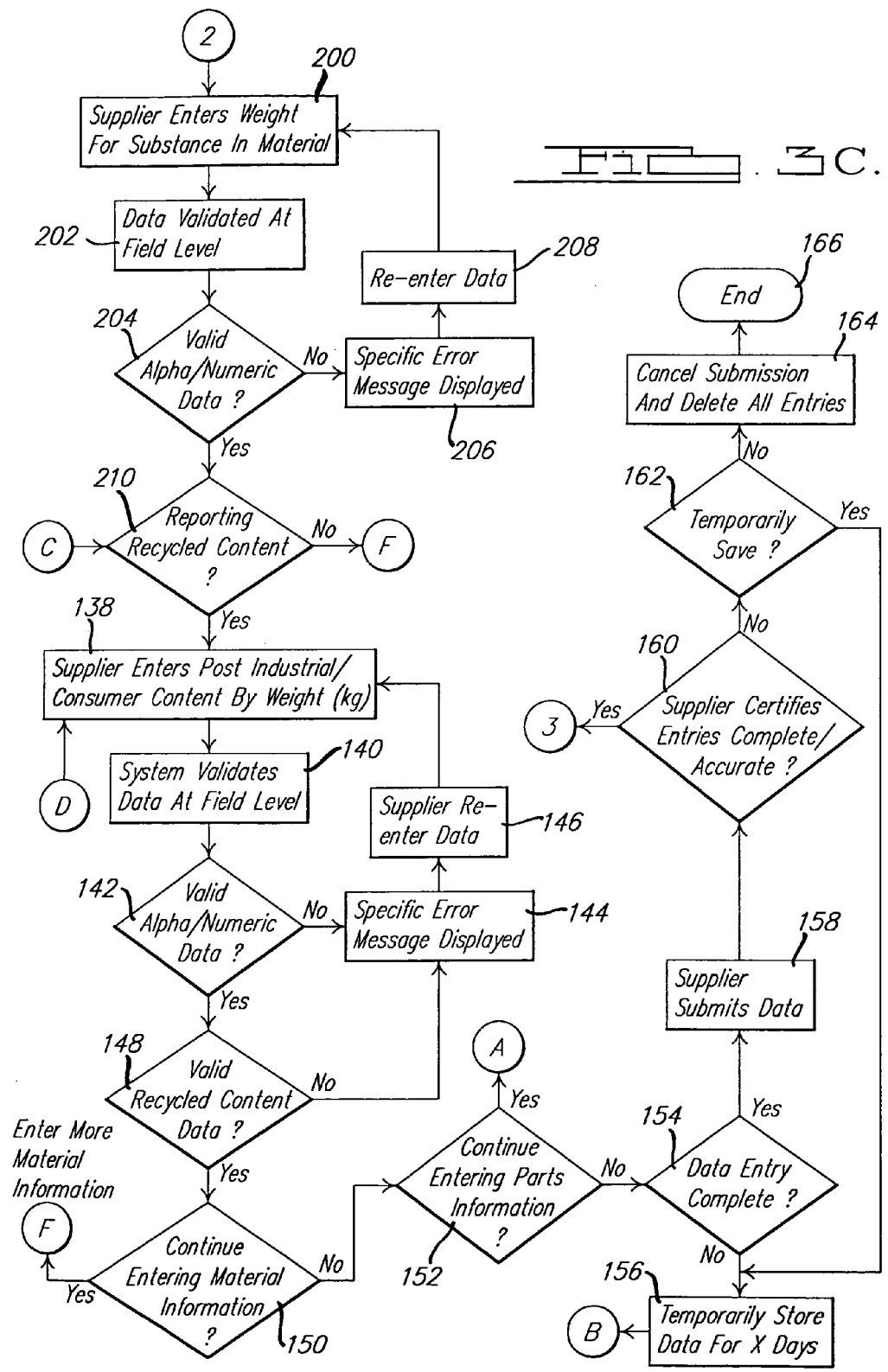

In diamond 126 in FIG. 3A, if the recycled content is reported, the method advances to block 138 in FIG. 3C. In block 138, the supplier enters data of post industrial/consumer content by weight (kg) of the parts supplied to the vehicle manufacturer. The method advances to block 140 and validates the data at field level via the computer system 12. The method then advances to diamond 142 and determines whether there is valid alpha/numeric data in the data entered. If not, the method advances to block 144 and a specific error message is displayed via the computer system 12. The method then advances to block 146 and the supplier re-enters the data. The method then advances to block 138 previously described.

In diamond 142, if there is valid alpha/numeric data in the data entered, the method advances to diamond 148 and determines whether there is valid recycled content data of the data entered. If not, the method advances to block 144 previously described. If so, the method advances to diamond 150 and determines whether to continue entering material information of the parts supplied to the vehicle manufacturer. If not, the method advances to diamond 152 and determines whether to continue entering parts information of the parts supplied to the vehicle manufacturer. If not, the method advances to diamond 154 and determines whether the data entry by the supplier is complete. If not, the method advances to block 156 and temporarily stores the entered data for a predetermined time period such as x days. The method then advances to block 104, previously described, in FIG. 3A.

In diamond 154, if the data entry is complete, the method advances to block 158 and the supplier submits the data to the vehicle manufacturer via the computer system 12. The method advances to diamond 160 and determines whether the supplier has certified that the entries are either one of or both complete and accurate. If so, the method advances to block 128, previously described, in FIG. 3D. If not, the method advances to diamond 162 and determines whether the data is to be temporarily saved. If so, the method advances to block 156 previously described. If not, the method advances to block 164, cancels the submission, and deletes all data entries. The method then advances to bubble 166 and ends.

In diamond 152, if it is determined to continue entering parts information, the method advances to block 168 in FIG. 3B. In block 168, the supplier enters the vehicle manufacturer part number. The method then advances to block 170 and the data is validated at a field level. The method advances to diamond 172 and determines whether the part number is valid. If not, the method advances to block 174 and displays a specific error message. The method then advances to block 168 previously described.

In diamond 172, if the part number is valid, the method advances to block 176 and returns and displays the part name. The method advances to block 178 and enters the supplier end-item part name. The method advances to diamond 180 and determines whether a restricted substance or recycle content in component of a supplier subcomponent (FSS) assembly part. If so, the method advances to block 182 and enters supplier's component/subcomponent part number and name. After block 182 or the restricted substance or recycle content is not in component of FSS assembly part, the method advances to block 184 and enters supplier material name, material specification, and material weight. The method advances to block 186 and validates the data at the field level by the computer system 12. The method advances to diamond 188 and determines whether the alpha/numeric data is valid. If not, the method advances to block 190 and displays a specific error message by the computer system 12. The method then advances to block 192 and re-enters the data. The method advances to block 184 previously described.

In diamond 188, if the alpha/numeric data is valid, the method advances to diamond 194 and determines whether the material is valid. If not, the method advances to block 190 previously described. If so, the method advances to diamond 196 and determines whether the part contains restricted substance(s). If so, the method advances to block 198 and the supplier selects substance's CAS number or chemical name from a popup list. The method then advances to block 200 in FIG. 3C.

In block 200, the supplier enters the weight for substance in material. The method advances to block 202 and data is validated at field level. The method advances to diamond 204 and determines whether the alpha/numeric data is valid. If not, the method advances to block 206 and displays a specific error message by the computer system 12. The method then advances to block 208 and re-enters the data. The method advances to block 200 previously described.

In diamond 204, if the alpha/numeric data is valid, the method advances to diamond 210 and determines whether reporting recycled content. If so, the method advances to block 138 previously described.

In diamond 210, if the recycle content is not being reported, the method advances to diamond 180 previously described. In diamond 196 of FIG. 3B, if the part does not contain restricted substance(s), the method advances to diamond 210 previously described. In diamond 150 of FIG. 3C, if entering more information is continued, the method advances to diamond 180 previously described. In diamond 126, if the recycle content is being reported, the method advances to block 138 previously described.

In diamond 122 of FIG. 3A, if no restricted substances in parts supplied to the vehicle manufacturer are certified, the method advances to diamond 212 and determines whether data entry is resumed. If so, the method advances to block 214 and the computer system 14 returns partially completed information to screen. After block 214 or if data entry is not resumed, the method advances to block 216 and the supplier refers to down-loadable list of restricted substances such as a CAS listing. The method advances to block 218 and inputs restricted management substance/recycle (RMS/R) data. After block 218, the method can advance to block 220 and review/print on-line summary of reported information as needed and end in bubble 222 or the method can advance to block 168, previously described, in FIG. 3B.

Referring to FIG. 4, the method may include creating end-user reports. The method starts in bubble 300 and advances to block 302. In block 302, the method is triggered and supplier or appropriate vehicle manufacturer personnel has need to query/analyze RSM/R data. The method then advances to block 304 and logs onto the vehicle manufacturer supplier network (VMSN). The method advances to block 306 and selects a report from a report menu. The method advances to block 308 and enters report selection criteria. The method advances to block 310 and selects output options such as display, print and/or download to personal computer. The method advances to block 312 and runs report. The method advances to bubble 314 and ends.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

The invention claimed is:

1. A computer method of restricted substance management and recycling in a vehicle manufacturing environment, said method comprising the steps of:
    inputting restricted substances and recycle content data of parts supplied by a vehicle supplier for a vehicle into a computer system of a vehicle manufacturer;
    reviewing the inputted data and determining parts with banned or recycled content or substances over predetermined thresholds; and
    reporting the determined parts to the vehicle supplier and the vehicle manufacture.

2. A computer method as set forth in claim 1 wherein said step of inputting comprises inputting data of restricted substances and recycle content by a the vehicle supplier.

3. A computer method as set forth in claim 2 wherein said step of inputting further comprises validating the inputted data.

4. A computer method as set forth in claim 2 wherein said step of inputting further comprises saving partial inputted data.

5. A computer method as set forth in claim 2 wherein said step of inputting further comprises acknowledging receipt of inputted data.

6. A computer method as set forth in claim 1 wherein said step of reviewing comprises analyzing inputted data for compliance with a restricted substance management standard.

7. A computer method as set forth in claim 6 wherein said step of reviewing further comprises comparing the inputted data to list of banned substances.

8. A computer method as set forth in claim 7 wherein said step of reviewing further comprises determining whether there are any banned substances.

9. A computer method as set forth in claim 8 wherein said step of reviewing further comprises sending a non-compliance notification to the vehicle supplier and vehicle manufacturer if there are any banned substances.

10. A computer method as set forth in claim 8 wherein said step of reviewing further comprises comparing the inputted data to a list of CAS numbers of substances with threshold content limits if there are no banned substances.

11. A computer method as set forth in claim 10 wherein said step of reviewing further comprises determining whether there are any substances with threshold content limits.

12. A computer method as set forth in claim 11 wherein said step of reviewing further comprises, for each substance, comparing the inputted mass ratio against a specific TCL for CAS number if there are substances with threshold content limits.

13. A computer method as set forth in claim 12 wherein said step of reviewing further comprises determining whether there are any reported substances with a mass ratio greater than the specific TCL.

14. A computer method as set forth in claim 13 wherein said step of reviewing further comprises sending a non-compliance notification to the vehicle supplier and vehicle manufacturer if there are any reported substances with a mass ratio greater than the specific TCL.

15. A computer method as set forth in claim 13 wherein said step of reviewing further comprises determining whether there is no single substance over the TCL or banned if there are no reported substances with a mass ratio greater than the specific TCL or there are no substances with TCL.

16. A computer method as set forth in claim 13 wherein said step of reviewing further comprises sending a compliance notification to the vehicle supplier and vehicle manufacturer if there is no single substance over TCL or banned.

17. A computer method of restricted substance management and recycling in a vehicle manufacturing environment, said method comprising the steps of:

inputting data of restricted substances and recycle content of parts supplied by a vehicle supplier for a vehicle into a computer system of a vehicle manufacturer;

validating the inputted data;

saving partial inputted data;

acknowledging receipt of inputted data by the vehicle manufacturer to the vehicle supplier;

reviewing the inputted data and determining parts with banned or recycled content or substances over predetermined thresholds;

sending a non-compliance notification to the vehicle supplier and the vehicle manufacturer if there are determined parts; and sending a compliance notification to the vehicle supplier and the vehicle manufacturer if there are no determined parts.

* * * * *